(12) United States Patent
Hoffman

(10) Patent No.: US 8,204,447 B2
(45) Date of Patent: Jun. 19, 2012

(54) APPLICATION PROCESSOR APPARATUS AND METHOD FOR MONITORING A WIRELESS COMMUNICATION NETWORK

(75) Inventor: George E. Hoffman, San Jose, CA (US)

(73) Assignee: Carrier IQ, Inc., Mountain View, CA (US)

( * ) Notice: Subject to any disclaimer, the term of this patent is extended or adjusted under 35 U.S.C. 154(b) by 0 days.

(21) Appl. No.: 13/312,876

(22) Filed: Dec. 6, 2011

(65) Prior Publication Data

US 2012/0079105 A1 Mar. 29, 2012

Related U.S. Application Data

(63) Continuation of application No. 12/346,397, filed on Dec. 30, 2008.

(51) Int. Cl.
*H04B 17/00* (2006.01)
(52) U.S. Cl. .................................................. 455/67.11
(58) Field of Classification Search ............... 455/67.11, 455/418, 419, 420, 423, 424, 425, 456.1, 455/456.6
See application file for complete search history.

(56) References Cited

U.S. PATENT DOCUMENTS

| | | | |
|---|---|---|---|
| 6,847,625 B2 * | 1/2005 | Heinonen et al. | 370/338 |
| 7,062,304 B2 * | 6/2006 | Chauvel et al. | 455/574 |
| 7,512,381 B1 * | 3/2009 | Sylvain | 455/66.1 |
| 2007/0027980 A1 * | 2/2007 | Herrod et al. | 709/224 |

* cited by examiner

*Primary Examiner* — Jeffrey Zweizig
(74) *Attorney, Agent, or Firm* — Patentry

(57) ABSTRACT

An application processor of a distributed architecture for monitoring mobile communication in a wireless communication network is claimed. Systems and methods enable receiving reporting data related to events that occur in a wireless network from the perspective of the wireless device. The data management system is capable of generating a data reporting profile and communicating with a wireless device. The application processor is capable of monitoring and reporting a plurality of conditions within the wireless device and sending and receiving communications from the data management system. The baseband processor is capable of monitoring and reporting plurality of conditions on the wireless network and sending and receiving communications with the application processor. Both the application processor and the baseband processor monitor and report the conditions of the device and the network by applying a series of logical rules found within the data reporting profile.

12 Claims, 8 Drawing Sheets

APPLICATION PROCESSOR APPARATUS AND METHOD FOR MONITORING A WIRELESS COMMUNICATION NETWORK

CROSS-REFERENCE TO RELATED APPLICATIONS

This is a continuation of application Ser. No. 12/346,397 filed 2008 Dec. 30. There are co-pending continuation applications: Ser. Nos. 13/312,881 and 13/312,884 all filed on 2011 Dec. 6. No new matter has been added.

BACKGROUND OF THE INVENTION

1. The Field of the Invention

The present invention relates to wireless communication networks and related systems and devices. More specifically, embodiments of the present invention relate to systems and methods for using a programmable agent within a wireless device within a distributed communications network to monitor wireless networks, devices, and/or the operation thereof.

2. The Relevant Technology

As a result of advances in technology and enormous increases in the number of wireless device users, the size and complexity of wireless communications networks has greatly increased. One consequence of such increases in size and complexity is that the relative increase in operational and performance problems associated with communications networks has also increased. Reliability issues, such as dropped calls, lack of coverage, poor audio quality, and application failure often lead to user frustration and to increased costs. As new services are introduced that use even more complex technology, exercise different usage modalities, and place additional demands on networks, network performance continues to be a prime concern. In fact, quality of service often has a direct impact on a service provider's profitability. Therefore, improving quality of service is a top priority for service providers.

Network monitoring solutions are well known in the art and widely employed by service providers. Unfortunately, the solutions that are currently available can only monitor and diagnose subsets of the overall telecommunications system in limited ways rather than providing a holistic view of network and device performance that may be needed to efficiently identify and resolve quality issues.

Typical approaches to network monitoring include "self-monitoring." In this case, a network element reports on its own operational status, performance and any errors that occur during its operation. The metrics reported by a single element can sometimes be indicative of a broader, system-wide problem, but rather than providing answers, problem resolution entails guesswork and extended troubleshooting, which wastes valuable resources.

Another common approach includes placing probes at various points in the network to determine if network elements are functioning according to specification. Sometimes referred to as "sniffers", "log monitors" or "event monitors," these monitoring systems are effective at identifying performance issues with a particular network element, but they fail to capture problems that stem from the interfaces among network elements, i.e., these solutions do not address the case where single elements are performing according to specifications, but problems occur when those elements interact with one another. This far more complex and subtle set of problems has costly consequences to network operators when services cannot be delivered to end customers.

Another monitoring approach involves pre-programmed service monitors, where specific elements perform service transactions to emulate "real-world" transaction activity; end to end performance is then monitored and the results reported. While these solutions may catch systematic failures, they cannot detect intermittent or dispersed problems, subtle impairments, or device or end user specific issues. Further, they can only test anticipated usage scenarios and fail to adapt to new usages and interactions between services.

Significantly, the aforementioned solutions lack the ability to monitor network conditions and intelligently and dynamically define and generate data reporting models in response to changing network conditions. Even with the employment of probes in a communications network, it is often the case that the probe provides only an indication of a problem, and actually troubleshooting the problem requires personnel to be dispatched to a physical location on the network, adding significant time and cost to problem identification and resolution. Moreover, these troubleshooting techniques do not provide a multi-faceted view of the different network layers, such as the physical layer, the applications layer, etc., and they do not correlate performance issues across these layers. As a result, numerous quality issues impacting end users go undetected or are misunderstood. Consequently, they may become crises because the performance data provided by currently available network monitoring solutions lacks the detail and timeliness needed to quickly identify, prioritize and resolve network issues.

Furthermore, currently available network monitoring solutions are unable to adequately monitor and report a particular end user's experience, meaning that the service providers must rely upon the end user to report performance problems to a customer service representative. As such, it is frequently the case that by the time the user has reported a problem, the problem cannot be duplicated due to the user's difficulty recounting the specific details of what the user experienced, the timing of the occurrence, along with a lack of underlying data to validate the information provided by the user. Additionally, because the service provider is unable to view network performance holistically, it is difficult for the service provider to understand the true scope of the reported problem and appropriately prioritize the problem for resolution. Therefore, the problem may not be resolved to the reporting end user's satisfaction, creating a disincentive for the end user to diligently report problems in the future. Furthermore, in such situations, the opportunity to prevent the issue from affecting other users of the system and to improve the overall quality of the network is missed.

Thus, situations frequently arise where the end user is alienated from the company providing the communications service, without the service provider even being aware of the cause or source of the end user's dissatisfaction. Moreover, because so many end user problems go unreported, it is almost impossible for service providers to obtain reliable information about the scope of a particular issue. Therefore resources are frequently spent solving issues that are well described, but only affect a small number of end users, versus problems that are poorly described but effect a much larger number of end users. As a result, a service provider with an incorrect understanding of the scope of an issue may allocate an inappropriate amount of resources toward resolution, or it may fail to recognize the value of prioritizing resolution.

Other monitoring solutions known in the art are directed to gathering and analyzing information about the performance of wireless devices. Typically, the monitoring software will be installed on a wireless device at the time of manufacture or by downloading the software onto the device. The software then runs continuously in the background, monitoring device and application performance. When a particular event or error associated with the device occurs, the software collects the data associated with the error or event and may upload it either in real time or at a later time to a data repository for analysis. One problem with such systems and methods, however, is that the systems require a relatively large amount of data to be uploaded to the data repository for analysis, which can drain the resources of the wireless device. Specifically, the frequent transfer of data or the transfer of large amounts of data may decrease the battery life and impact processing performance of the wireless device, which may create further user frustration and dissatisfaction with the communication service.

BRIEF SUMMARY OF THE INVENTION

In view of the foregoing, and other problems in the art, the present invention relates to systems and method that include a programmable agent that may be incorporated in the mobile device itself and which is capable of monitoring and receiving data related to communications networks, performing an initial filter and analysis of the information, and efficiently transferring the data within multiple network layers and elements. In this manner, valuable diagnostic data corresponding to the performance of services within the context of conditions occurring among multiple layers of the network may be efficiently filtered, analyzed, and aggregated so that the resources of the system may be conserved.

The methods disclosed herein are directed to service monitoring techniques that may be used on a vast number of wireless devices, each with relatively limited functionality, including constrained memory capacity and battery life. The systems and methods of the present invention use complex dependencies to monitor and capture network and device performance in response to real-time changing network conditions. In some instances, these conditions are transient, geographically isolated, and/or dependent on specific interactions between network elements. Thus, the application of the data management system of the present invention in the specific application of wireless device networks addresses a unique solution previously unknown in the art.

In particular, embodiments of the invention enable the reception of reporting data relating to events (such as network system errors or device errors) using a plurality of rule-based data reporting profiles that may be generated manually by a network administrator, software developer or other personnel involved in the operation of the network. The data reporting profiles may be created offline as a portion of a data analysis solution, or automatically generated based on network parameters or other events. The data reporting profiles define what information is to be reported to the system from data that exists locally on the device in response to certain conditions and events, a series of rules directed to what analysis, aggregation, filtering or the like should be performed on the information that exists or is generated on the device, as well as the conditions and events that cause the device to upload the processed information. The data reporting profiles are distributed to the mobile devices and include executable commands which enable the mobile devices to perform various data management operations within the device itself, rather than requiring a number of unnecessary and expensive data transfers. Within the data reporting profiles, triggers can be defined and, when detected, cause data to be processed and uploaded for analysis. In this manner, a user may initiate the analysis of data relating to events which may be undetectable by the system. Further, the data that is received and processed based on these data reporting profiles provides a much better characterization of events. The data can properly represent, by way of example only, the state of the network, of the device, as well as the location of the device at the time of the trigger.

These and other advantages and features of the present invention will become more fully apparent from the following description and appended claims, or may be learned by the practice of the invention as set forth hereinafter.

BRIEF DESCRIPTION OF THE DRAWINGS

To further clarify the advantages and features of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
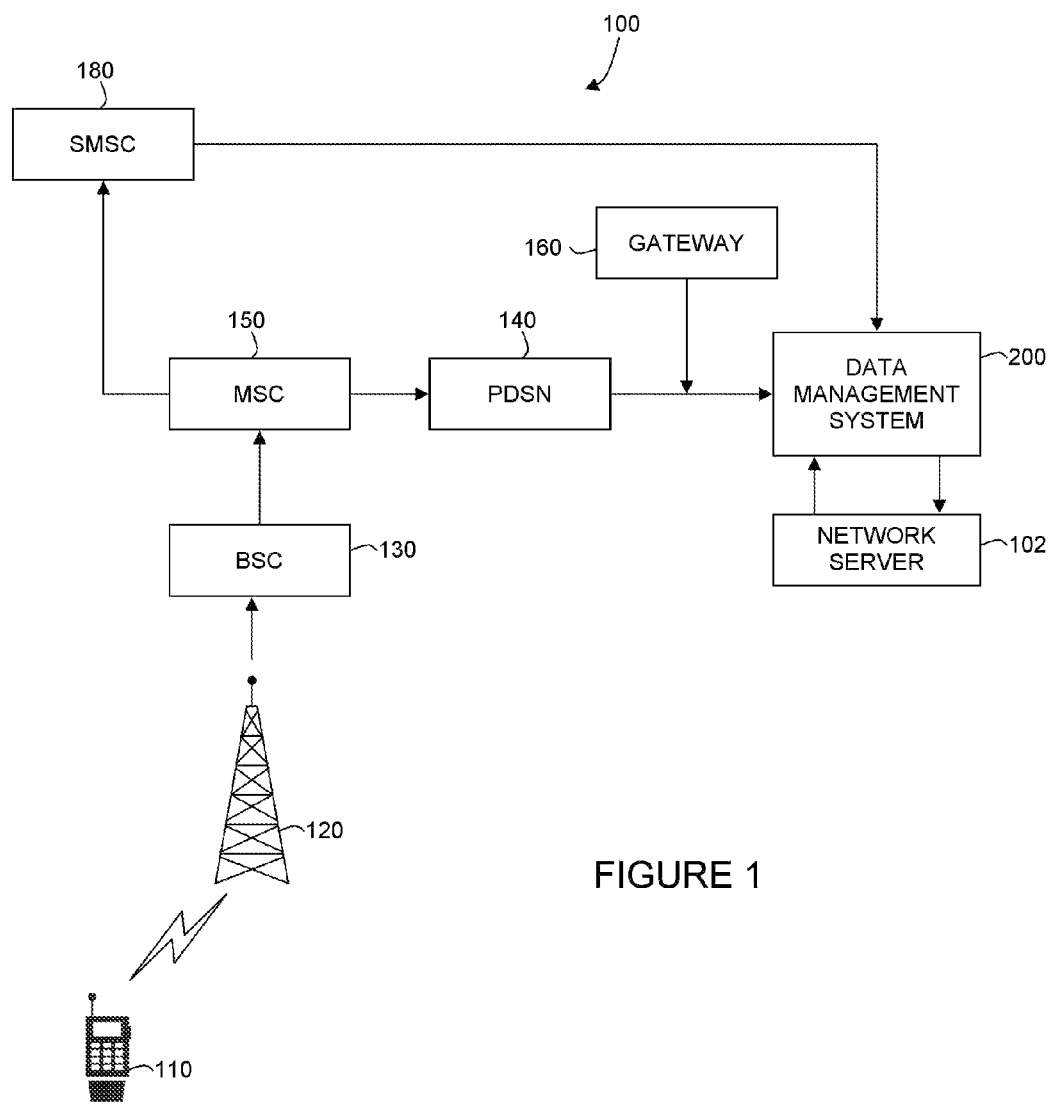
FIG. 1 illustrates an example of a wireless communications network in which the network monitoring system of the present invention may be practiced.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with communications network monitoring and data reporting. More particularly, embodiments of the invention enable the monitoring of data relating to problems and errors including, for example, problems and errors which are not easily detectable by conventional systems. In particular, embodiments of the invention relate to using a programmable wireless device capable of receiving a series of logical filters in a data reporting profile and applying those filters in the wireless device to perform a series of logical operations on the reporting metrics stored within the wireless device. As described more fully below, by performing filtering and aggregating the metrics in the wireless device before transmitting them to the telecommunications server, embodiments of the present invention are able to intelligently and efficiently monitor individual devices and report problems or errors in the communication system or in a device operating in the communication system.

Thus, embodiments of the invention utilize a communications network monitoring and data reporting system which is highly distributed, which utilize an intelligent agent residing on the distributed devices which is capable of performing various logical operations on the data of the device, rather than transferring large amounts of information to a central system where the data is processed. Thus, aspects of the invention are capable of reducing the volume of data sent and the number of communications transactions occurring between the devices and the central system.

As such, the embodiments described herein offer a highly efficient monitoring and data reporting system that is capable of detecting triggering conditions locally at the devices, initiating the retrieval and creation of reporting data based on the triggering conditions, organizing the reporting data into a series of reporting metrics, and transferring the reporting metrics to the communication systems according to a reporting schema operating locally on each of the devices.

One embodiment of the present invention utilizes a wireless device with a dual processing configuration. As described more fully below, in such configurations, the present invention may also filter and aggregate reporting information within each processor so that a fewer number of transmissions are sent between the two processors.

In the present invention, an agent within the wireless device may trigger or otherwise initiate the retrieval of data stored locally within the device, based on the configuration established in the data reporting profile that is sent to the wireless device from the communications server. When triggered, the device or system could collect robust background operating data to accurately capture the context of the device and the environment it is operating in. This reporting information would then go into a reporting and analysis system within the wireless device which could better represent the users experience to help improve quality. For example, this data can be used to prioritize the problems of a network, characterize problems in the network, characterize the problem, provide feedback to uses on progress related to resolving the problem and the like.

Advantageously, by aggregating and filtering the reporting information as it is passed from the various components within the wireless device, embodiments of the present invention are able to gain a greater contextual understanding of what the problems of the network may be. For example, as described more fully in the examples below, in one scenario, a series of reporting information regarding the processes operating on the wireless device may be filtered and aggregated into a series of small, meaningful packages that may be sent to a baseband processor where the information regarding the processes may be annotated with additional information relating to the conditions of the wireless connection at the time the specific processes were running. Then, this annotated information may be sent to the communication network, where it may supply a greater contextual understanding of what the overall operating conditions in the wireless device were like at the time the processes were being run. Advantageously, the improved reporting systems and methods of the present invention supply rich data on customer issues which can then be used to improve the error reporting and detection within the system.

I. Exemplary Wireless Communications Network and Wireless Devices

In order to describe the various methods of the invention, FIG. 1 illustrates an example of a wireless network 100 in which the invention can be practiced. It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

The network of FIG. 1 represents only an example of the suitable environments in which the invention can be implemented, and other network architectures are possible. In particular, wireless network 100 is described and illustrated as a Code Division Multiple Access (CDMA) network, whereas the invention can be practiced with other wireless networks, including Global System for Mobile Communications (GSM), Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future.

In this example, wireless network 100 includes a radio frequency (RF) network that provides radio connectivity and session management for circuit-switched and packet data technology-based communication. Accordingly, wireless network 100 includes or interfaces with all of the elements necessary to route circuit-switched telephone calls and/or packet data communication through the network, including one or more wireless devices 110, a base station 120, base station controller (BSC) 130, mobile switching center (MSC) 150 and a packet data serving node (PDSN) 140. More specifically, the methods of the invention can be used in conjunction with a circuit-switched network, a packet data network, or both.

The methods of the invention may be implemented using various transport protocols, such as Internet Protocol (IP), short message service (SMS) and Short Data Burst services, etc. Wireless network 100 may also include a Home Location Register (BLR), Visiting Location Register (VLR), billing and provisioning systems, one or more gateways 160, the servers and infrastructure necessary to use short message service messages such as the short message service center (SMSC) 180, and may include many other network elements not depicted in FIG. 1. Application servers or third party reporting systems (depicted as network server 102 in the exemplary embodiment), may reside outside network 100 and can be used in conjunction with the present invention. References herein to the terms "wireless network" or "the network" throughout should be construed as inclusive of the network infrastructure, servers, end user devices, and applications and services.

II. Structure of Exemplary Data Reporting and Management System

Figure 2:
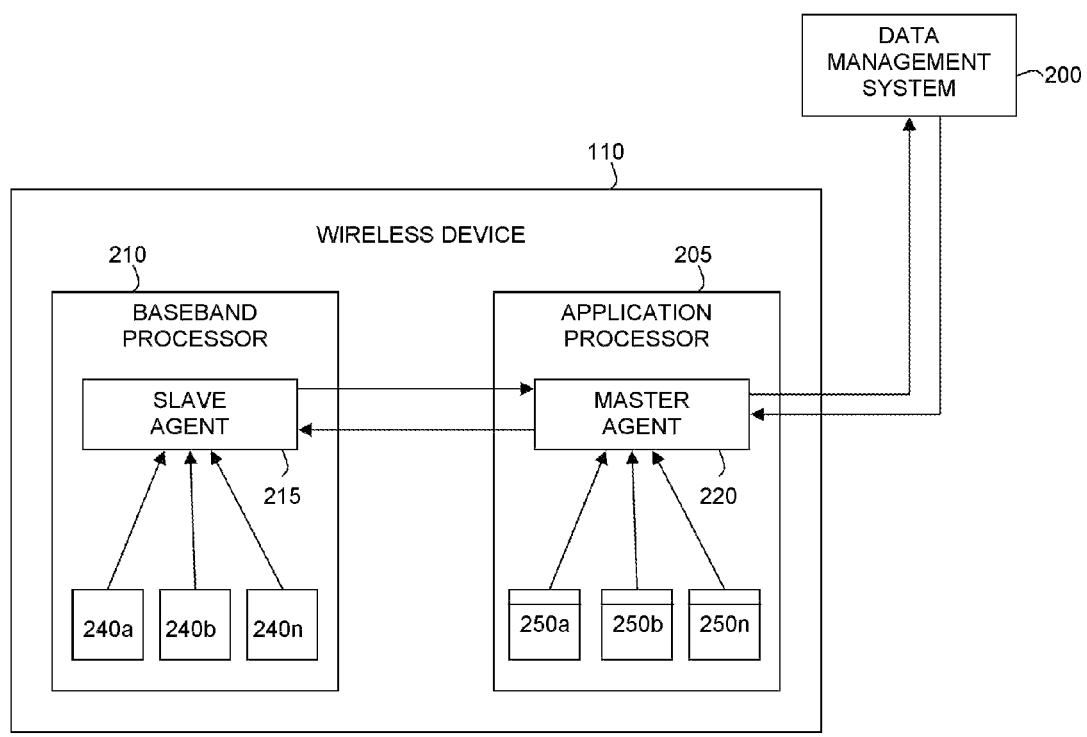
FIG. 2 is a schematic view of the network monitoring system including an implementation within the wireless device according to one embodiment of the present invention.

FIG. 2 illustrates one embodiment of a data reporting and management system 200 that may operate within the wireless device 110. In this example, the wireless device 110 communicates with a data reporting and management system 200. As described more fully below, unlike traditional systems wherein the reporting data is simply stored in the wireless device 110 and later uploaded to the management system 200 where the reporting data is analyzed and filtered, in the present invention, the reporting data is analyzed and filtered within the wireless device prior to uploading to the data reporting and management system 200. Furthermore, for purposes of illustration, the data reporting and management system 200 functions in conjunction with the packet data network, and may receive data from nodes on the circuit-switched network or elements of the system located in a circuit-switched network in addition to receiving data from a packet data network. Gateways, network monitors and other network elements may be employed to facilitate transmission of data between the networks and the data reporting and management system 200. Furthermore, in one embodiment, elements of data reporting and management system 200 may be implemented on one or more network servers 102 residing within the network operator's network. Alternatively, data reporting and management system 200 may be implemented as a service hosted by a service provider other than the network operator, and elements of the system may therefore reside outside the network operator's network and be equipped to communicate with the various nodes in the network operator's network.

The functionality disclosed herein may be employed in connection with a wide variety of network devices, either wireless or wireline, including radios, personal digital assistants ("PDA"), network servers, desktop computers and other devices associated with network communication. The system 200 interacts with devices 110 to provide them with a series of rule based instructions on when and how to retrieve and send reporting data to the management system 200 so that the reporting data may be used to analyze system events or device events. In some instances, the reporting of data may be initiated by users of the devices 110. Then, the reporting data is created at the devices 110, stored at the devices 110, filtered and aggregated at the device 110 into a series of contextually filtered packages of reporting information and then uploaded at a later time. Thus, the retrieval and/or creation of reporting data can be time delayed yet still provide the context of the event.

In embodiment of FIG. 2, the target wireless devices 110 enable an end user to gain access to telephony services and may be equipped to provide access to Internet or multimedia data through any suitable protocol that allows the target wireless devices 110 to participate in a packet data network. Target wireless devices 110 can be substantially any mobile wireless device that can communicate in the environment of wireless network 100, and can be a wireless telephone handset, a wireless personal digital assistant (PDA), or another wireless communication device. The wireless devices can also be referred to as mobile stations, or mobile devices, and hereinafter will be referred to as wireless devices.

As briefly described above, one embodiment of the present invention comprises a wireless device 100 which utilizes a dual processor configuration. In the embodiment shown in FIG. 2, the wireless device 110 includes an application processor 205 and a baseband processor 210. In one embodiment of the present invention, the application processor 205 operates as a master processor with a master agent 220, while the baseband processor 210 operates as a slave processor with a slave agent 215. In this configuration, the slave agent 215 within the baseband processor 210 is capable of receiving a plurality of metrics and reporting information from a plurality of processes 240a-240n operating on the baseband processor 210 and, as described more fully below, performing a series of initial information management processes on the reporting information in order to condense the reporting information into a series of meaningful packages that describe the conditions and characteristics of the processes 240a-240n operating on the baseband processor 210 in an efficient and meaningful manner.

Once the slave agent 215 has filtered and aggregated the reporting information into a series of reporting packages, the packages are sent to the master agent 220 in the application processor 205, where the reporting packages may be annotated with additional reporting information from a plurality of application processes 250a-250n that describe the conditions of the application processes 250a-250n at the time the baseband applications 240a-240n were running. In this manner, the reporting packages from the slave agent 215 are augmented and annotated by the master agent 220 before being sent to the data management system 200 so that the information in the reporting packages provides a greater contextual understanding of what the overall conditions in the mobile device were during the event.

As described more fully below, embodiments of the present invention utilize a data reporting profile that may be developed by the data management system 200 or related entity and distributed to the application processor 205 and baseband processor 210 of the wireless device 110. The data reporting profile includes a series of rule-based data reporting instructions, including a number of "triggers," or conditions and events which cause a device to create or retrieve reporting information or upload the reporting information. The information is then stored in a series of buffers associated with the agents 215 and 220. In one embodiment of the present invention, one data reporting profile may be sent to the master agent 220 in the application processor 205, while another is sent to the slave agent 215 in the baseband processor 210. Thus, in some instances, a triggering event may be identified by the slave agent 215, and data may be stored by the slave agent 215 without a triggering command from the master agent 220. In this scenario, a series of reporting packages may be created and sent by the slave agent 215 to the master agent 220, where the packages may be augmented and annotated by reporting information routinely stored in the buffers of the master agent 220. In other instances, the master agent 220 may detect a triggering event in the application processor 205 and may send a command to the slave agent 215 instruction the slave agent to retrieve or generate reporting information from the processes 240a-240n for a specified period of time, or until the master agent 220 sends another command terminating the retrieval of information. Then the information may be filtered, aggregated, and sent by the slave agent 215 to the master agent 220, where the reporting packages are further filtered and augmented before being sent to the data management system 200. Thus, in the master/slave dual processor configuration, each processor may independently initiate the retrieval or creation and reporting of information. This reporting information is filtered and assembled into a series of meaningful packages that are sent to the master agent 220, which may further augment and annotate the packages before transmitting them to the data management system 200 of the system. Thus, one aspect of the present invention is the ability to transfer a series of rule-based commands to the components of the wireless device, so that the components are able to independently identify interesting events that the data management system 200 would like to receive information about. This information is then "pushed" to the data management system 200 in a series of contextually meaningful packages that describe the overall state of the system using a reduced number of efficient data transmissions. Thus, one advantage of the present invention is the ability to perform a variety of data operations on the reporting information as early as possible so that valuable system resources, such as processing power, memory, and battery life are not wasted by the systematic transfer of large amounts of unfiltered reporting information.

In other situations, the reporting data may be "pulled" from the components of the wireless device 110 by sending a command to the master agent 220 which triggers the retrieval of information in the master agent 220 and all slave agents 215 associated with the master agent 220. As may be understood by one of ordinary skill in the art, however, this configuration is less preferable than situations where the retrieval or creation of reporting data and subsequent transmission of reporting data is initiated within the wireless device itself using a series of previously established collection rules and logic because the variation in the specific configuration, operating conditions, environment, user-commands, signal strength, and the like that occur at the device side of the system typically means that the wireless devices 110 are generally in the best situation to detect any errors or inconsistencies in the system 100.

As previously mentioned, the data management system 200 is capable of dynamically generating and transmitting a series of rule-based data reporting profiles to a population of wireless devices. The data reporting profiles may be generated manually by a network administrator, a software developer or other personnel involved in the operation of the network (hereinafter referred to as "network administrators"), created offline as a portion of a data analysis solution, or automatically generated based on network parameters or other events. Furthermore, the data reporting profiles may be created by a third-party entity associated with the data management system 200 who is interested in receiving reporting information from the plurality of devices associated with the system. Data reporting profiles define what information is to be stored locally on the devices in response to which conditions and events, as well as the conditions and events that cause the device to upload the reporting information to the data management system 200.

Conditions or events include any occurrence in the network or on the device that the device can sense, such as a call dropping or a user pressing a button on the device. Conditions and events also include the passage of time, or a request from a network administrator that the device periodically or systematically report information back to the server.

Thus, the wireless device 110 receives data reporting profile(s) from the data management system 200 and executes data capture processes in response to triggers defined in the data reporting profiles, which initiate and terminate data reporting activities, as well as in response to other rules and instructions in the data reporting profiles. Data reporting rules, triggers, and other instructions contained in data reporting profiles are sometimes referred to herein collectively as "data reporting directives" as a matter of convenience. Data which has been generated or captured by the wireless devices 110 may then be buffered awaiting creation of a metrics package. Once created, a metrics package may be archived in a metrics archive, deleted, or uploaded to metrics collector, described more fully below.

The agent 220 may communicate with the data management system 200 in order to provide data reporting and management services. For example, a reporting system in the data management system 200 may provide reports, raw data and other data products other components of the system 100. Network administrators and external systems can then access the data by way of network server 102. Elements of data reporting and management system 200 may also communicate with various messaging services in wireless network 100 such as SMSC 180 to initiate communication with one or more target wireless devices 110 or to notify network administrators that reporting data has been generated and is available for analysis.

It should be noted that FIG. 2 illustrates one manner in which various functionalities associated with the data reporting management system 200 may be allocated. Accordingly, the functionalities disclosed herein in connection with the data reporting and management system 200 may be allocated in a variety of other ways as well depending upon considerations including, but not limited to, the various types of distributed systems and devices employed, the data desired, and the structure of the communications network or other system. Thus, the functionality allocation illustrated in FIG. 2 is exemplary only and should not be construed to limit the scope of the invention in any way.

III. Exemplary Data Reporting Profiles

Figure 3:
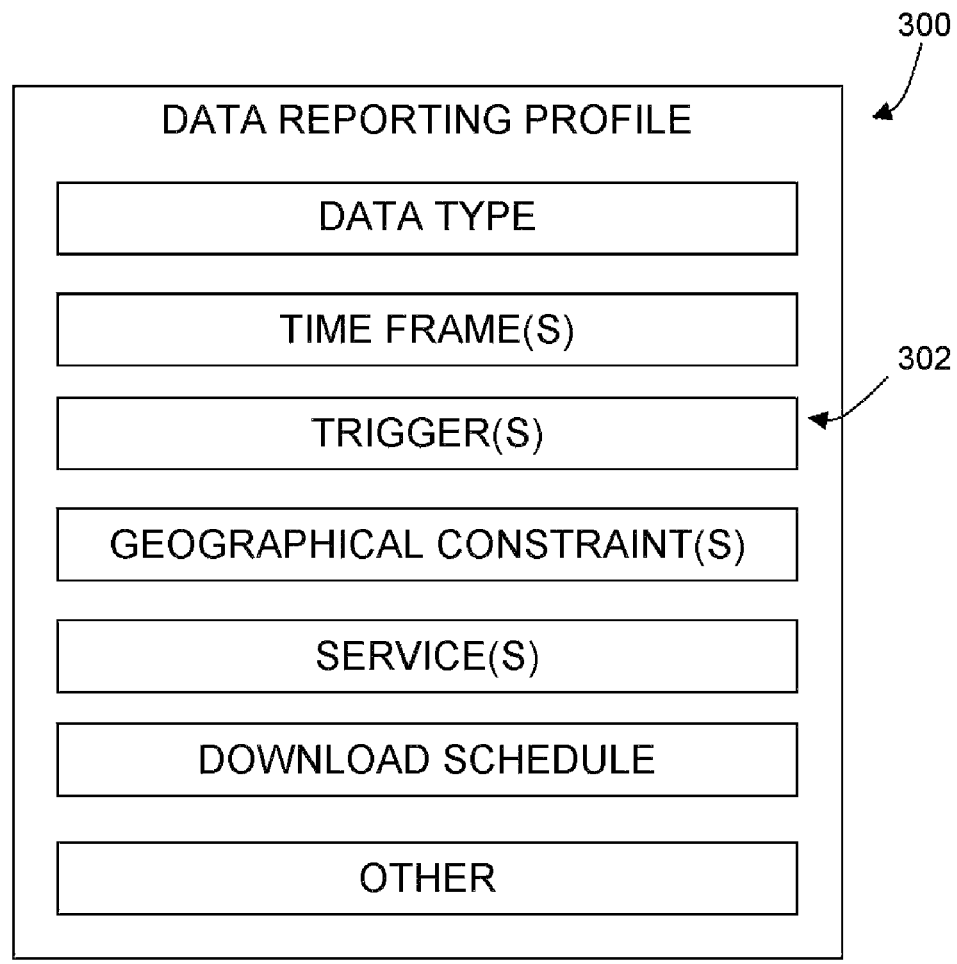
FIG. 3 is a schematic view of a data reporting profile that may be employed by embodiments of the data reporting and management system.

Attention is directed now to FIG. 3 where aspects of a data reporting profile 300 are illustrated. As generally indicated in FIG. 3, the data reporting profile 300 includes a variety of parameters 302 that define not only a set of data that is to be captured and stored, but also the conditions under which data reporting will take place and the manner in which that data is to be collected and processed.

The data reporting profile may be configured to include multiple triggers which initiate and terminate data sampling over some period of time and in response to certain occurrences. In one case, data reporting may occur in response to a trigger that is defined as the occurrence of an event. In other cases, data reporting may be initiated or terminated in response to a trigger that is defined as the lack of an event occurrence. For example, a data reporting profile may specify that data reporting begins upon the launch of a particular application and aborts if the device fails to sense a user-initiated trigger (e.g., key sequence, dedicated key, menu option, etc.) while the application is running. In this case, launching the specified application is the initiating trigger that causes data reporting to commence, data is buffered, and when the user fails to enter the key sequence, press the dedicated key or select the corresponding menu option while the application is running, the abort trigger causes the data reporting process to cease. In this case, the buffered data may not be transformed into a metrics package, and it may or may not be deleted.

In another example, the data reporting profile 300 may specify that data reporting begins upon the detection of a dropped call. In this case, the detection of a phone call is an initiating trigger that causes the data reporting process to commence. Data is buffered in the wireless device, and in the instance where the phone call is prematurely terminated (i.e. neither the calling device or the receiving device detected an "end call" command), the buffered data is filtered and transformed into a metrics package, which may be subsequently transmitted to a master agent 220 and subsequently to the data management system 200.

The data reporting profile may also contain instructions for the conditions under which reporting data is transformed into a metrics package, and whether and when the metrics package should uploaded to both the master agent 220 the data management system 200. Continuing with the previous example, the data reporting profile may specify that if the device senses a user-initiated trigger while the application is running, all the buffer data captured prior to the sensing of the user-initiated trigger, and any other data collected for a specified time after the sensing of the trigger are to be transformed into a metrics package and uploaded to a master agent 220. In other cases, the data reporting profile 300 may instruct that information about both the occurrence and non-occurrence, as applicable, of specified events, as well as whether data has been captured or not during some period of time be reported.

The data management system 200 includes a data reporting profile editor that enables a network administrator to retrieve and edit one or more existing data reporting profiles in the event that circumstances require a change to those data reporting profiles. Moreover, once completed, the data reporting profile 300 may be stored in a profile database for reuse, backup purposes and/or for further editing, copying, or other processes.

In any case, the data reporting profile 300 illustrated in FIG. 3 specifies, among other things, the type or types of data that are to be retrieved in connection with the data reporting profile 300. The data retrieved in connection with the data reporting profile 300 may comprise virtually any type of data concerning wireless network 100 and/or target wireless devices 110. Thus, the data desired may relate to the UI of the target wireless device 110, the application or applications resident on the target wireless device 110, the network services accessed by target wireless device 110, the performance of other network elements such as application and network servers, and considerations concerning the various network layers, such as the transport layer and physical layer.

In addition to specifying various data types, the illustrated data reporting profile 300 can also specify a time parameter, namely, the time frame, or time frames, during which some or all of the specified data is to be sent to the data management system 200. For example, as a result of users calling customer service to report a non-responsive or slow running application that is not detected by the automated system, a data reporting profile may be generated that is directed to application analysis. In this case, the data reporting profile may specify that data reporting is to begin as soon as the wireless device launches the application in question. The requested reporting data enters a buffer on the device so that it can be included as part of a metrics package if a user-initiated trigger is sensed. The data reporting profile may further specify as part of the data reporting rules, that a ten second buffer of information preceding every launch of the particular application is to be saved, and that data be captured for the duration of the application run-time. In the event the trigger is sensed during application run-time, an additional ten seconds is captured and the data captured before launching the application, during the application run-time and after sensing the trigger is transformed into a metrics package. In a typical embodiment, when the client 110 senses the trigger, it not only creates the metrics package, but it also performs a variety of data management processes on the information, so that the metrics package may include only that information that is useful or meaningful. Then the client 110 uploads the metrics package to the data management system 200. Alternatively, the package can be stored and transmitted to the system 200 at a later time.

With continuing attention to FIG. 3, the data reporting profile 300 includes, refers to, or implicates various triggers which are used to determine if and when a data reporting process specified in the data reporting profile should initiate, abort, and terminate. In addition the data reporting profile 300 includes a variety of contextual filters, data lookup tables, or other data management processes that may be performed on the data prior to its being incorporated into a metrics package.

Some implementations of the data reporting profile 300 may specify that transmission signal ("Tx") strength data be reported for Internet Protocol (IP) data calls initiated by a network-based instant connect communication session, also known as Push to Talk®. In other cases, the data reporting profile 300 may specify that data is to be captured and reported concerning messaging services accessed by the target wireless device 110. Because the wireless device participates in each service delivered to the end user and utilizes a software stack that communicates with each network layer necessary to deliver the service, the ability to capture metrics in relation to a specific service, and ignore those metrics when not utilizing the service, provides a significant benefit over existing solutions.

For example, to monitor the transmit signal strength under the conditions described above, a network probe known in the art would have to monitor all transmit power, for all wireless terminals, across all transports (voice or IP for example), for all services (telephony, messaging, browsing and instant connect communication for example). The scale and scope of this data reporting process effectively makes this data irretrievable by any methods other than those disclosed herein in conjunction with the present invention.

IV. Exemplary Data Reporting Profile Transmission

Data reporting profiles may be provided to the wireless devices 110 in a variety of ways, including "pushing" the data reporting profile to the target device, sending a message, such as an SMS, to the target device prompting it to retrieve the data reporting profile, and preparing the data reporting profile for download the next time the target device contacts the data management system 200 such as when it uploads a metrics package. Such profile transmission to the master agent 220 and slave agent 215 residing on the target device(s) 110 may be achieved using any of a variety of transport mechanisms and standards including Short Message Service ("SMS"), Hypertext Transport Protocol ("HTTP"), Hypertext Transport Protocol Secure ("HTTPS"), Wireless Application Protocol ("WAP") Push, IP-based Over-the-Air (IOTA) protocol, OMA/DM, or other protocols that are known in the art or that may be developed in the future.

When received by a target device, the data reporting profile 300 is processed by the master agent 215 and subsequently distributed to the slave agent 220, if needed. In some cases, the data reporting profile 300 may be stored as received, or integrated with or take the place of previously received data reporting profile(s). Factors that affect how the data reporting profile is processed by the agents 215 and 220 include, but are not limited to, the suitability of the device to the data reporting requirements defined in the data reporting profile, the relative priority of the data reporting profile and any previously received profiles, and any explicit processing rules stated in the data reporting profile. If processing the new data reporting profile by the agent 215 or 220 results in the data reporting activity differing in any way from that specified in the data reporting profile (e.g. if the device self-selects out of the data reporting activity), the master agent 215 may communicate back to the system 200 the specifics of how and why the data reporting activity differed.

V. Data Reporting and Processing in the Wireless Device

The data reporting function and management of the wireless device 110 is based around one or more metrics which are generated and/or captured by the software or hardware components operating within the wireless device 110 during its operation, and which are indicative of device and/or network performance. In one case, during the device manufacturing process, software commands are integrated into the operating system or other device software that cause metrics to be generated or captured. As the metrics are generated or captured, they are transformed into a data structure. The two agents 215 and 220 are then presented with the metrics, where they each determine, based on the data reporting profile(s) under its governance, whether a given metric is of interest at the time it is generated, and if so, it may store the metric into a buffer, where it is available to be included in a metrics package at some later time. The process of storing metrics into buffers is referred to as generating metrics. However, it should be noted that in some cases, the generated metrics may be captured directly into a metrics package without having first been buffered. Otherwise, the process of metrics generation and buffering can occur constantly as part of the basic operation of wireless device 110. The control of this data reporting logic is further described below in FIG. 5.

In the exemplary embodiment, the following aspects are instrumented to generate metrics, but substantially any aspect of the wireless device 110 functionality can generate metrics that can be stored. Metric generation includes all error display routines which may be captured by the data reporting and management system for later analysis. Exceptions (software that violates fundamental principles of the target device operation) and task timers (timers that assure no single function can take all the processing resources and that detect infinite loop type errors) can generate metrics that indicate the state of the application when a trigger is sensed. When captured and uploaded, the metrics can enable application developers to find errors in their software that occur in the field and significantly speed problem diagnosis. When uploaded the user interface metrics can be used to understand how users interact with the application or device to help optimize application design and detect errors or points of confusion.

Figure 4:
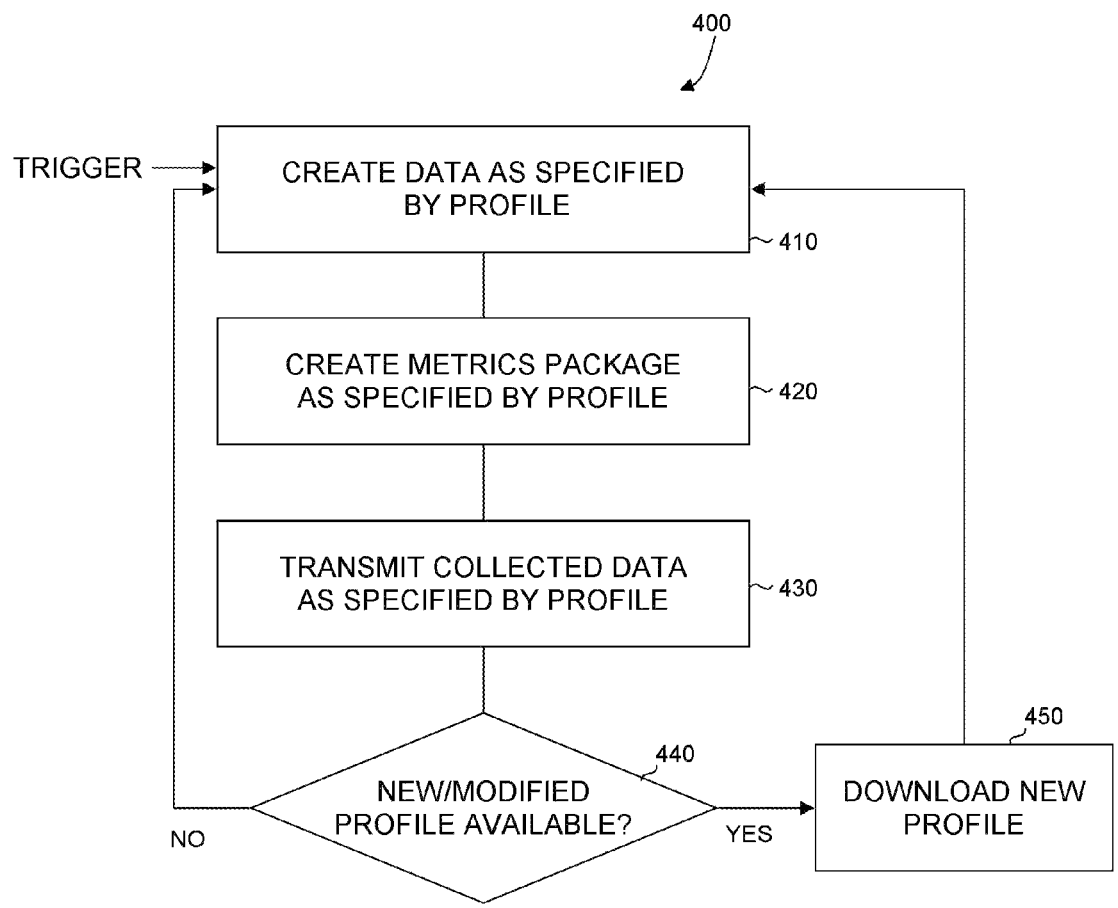
FIG. 4 is a flow diagram illustrating aspects of an exemplary process for receiving data in connection with a data reporting profile.

With attention now to FIG. 4, details are provided concerning a process 400 performed by one or more target devices in connection with one or more data reporting profiles. The process 400 begins with generation and/or retrieval of metrics as part of the target device operation. Data reporting commences 410 as specified in the data reporting profile. Such data reporting may commence in response to an initiating trigger, such as the launching of an application, or the data reporting may occur continuously while the device is on, and so on. Once a data reporting profile is activated, data reporting can begin and proceed continuously, and it can start, stop and restart to sample data based on data reporting rules and triggers defined in the data reporting profile. As noted earlier, during the data reporting process, the metrics can be stored in temporary memory, and may or may not ever be used. The metrics buffer may be a circular buffer that stores N samples of data that are available for use, in creating a metrics package if necessary. Use of the buffered data allows a view of metrics generated before a particular error condition occurred, for example. This historical view, along with other metrics surrounding an error condition, can be used in analyzing any particular problem. Thus, in response to a trigger, the buffered data can be captured in a metrics package along with any specified data arriving after the trigger was activated. In other cases, data can be captured and written directly to a metrics package without having first been buffered.

In any case, once the reporting data has been captured, the reporting data is transformed 420 by the agent 215 or 220 into a metrics package and placed in the metrics archive of the agent 215 or 220. As described more fully below, the transformation of reporting data into a metrics package may include a filtering process, an aggregation process, or any number of data management operations that may be performed using the logic and rules set forth in the data reporting profile 300. Because device resources are by nature constrained, the agents 215 and 220 may employ methods for managing the priority of metrics packages stored on the device. For example, each time a metrics package is added to the metrics archive of an agent 220, the agent 220 may calculate the total non-volatile memory used. If the total non-volatile memory required to store a new metrics package exceeds the amount of memory allotted to the metrics archives the agent 220 may reassess the nature of the data in each stored metrics package. In one case, and under certain conditions, one or more metrics packages may be uploaded to the system 200 to make room for the new metrics package on the device. Under certain conditions, the agent 220 may employ an algorithm for reviewing the stored metrics packages and selecting metrics packages for deletion. The algorithm may consider criteria including data storage allocations specified in a data reporting profile, the nature and priority of the data, the timeliness of the data, the size of the new package to be stored, and the size of the package to be deleted. Selected metrics packages are then deleted from the metrics archive on the device until there is enough memory to store the new metrics package.

Depending on whether the metrics package is created by a master agent 220 or a slave agent 215, the metrics package is then transmitted 430 to either a metrics collector located in the master agent 220 or to the system 200 at a time specified in the applicable data reporting profile or profiles. In a typical embodiment, the sensing of a trigger causes an agent 215 to both create the metrics package 420 and transmit the metrics package 430. Alternately, the trigger may simply cause the agent 215 to create the metrics package, in which case the metrics package may be transmitted at a later time, e.g., as the result of an "on-demand" command sent to the device by the system or a network administrator, or as the result of resource management by the agent 215.

Finally, as indicated in FIG. 4, it is determined 440 if a new or modified data reporting profile is available for download by one or more target wireless devices 110. While this stage in the process is depicted in FIG. 4 as part of a sequential operation, determination of whether or not a new or modified data reporting profile is available for download is not contingent upon any other stage in the data reporting process. If a new or modified data reporting profile is available, the available new or modified data reporting profile is downloaded 450 to the target wireless devices. Otherwise, in accordance with rules specified in the data reporting profile, it resumes data reporting activities 410. In many cases the existing data reporting profile may stay on the device for any amount of time with or without modification and perform numerous instances of data reporting and upload.

Figure 5A:
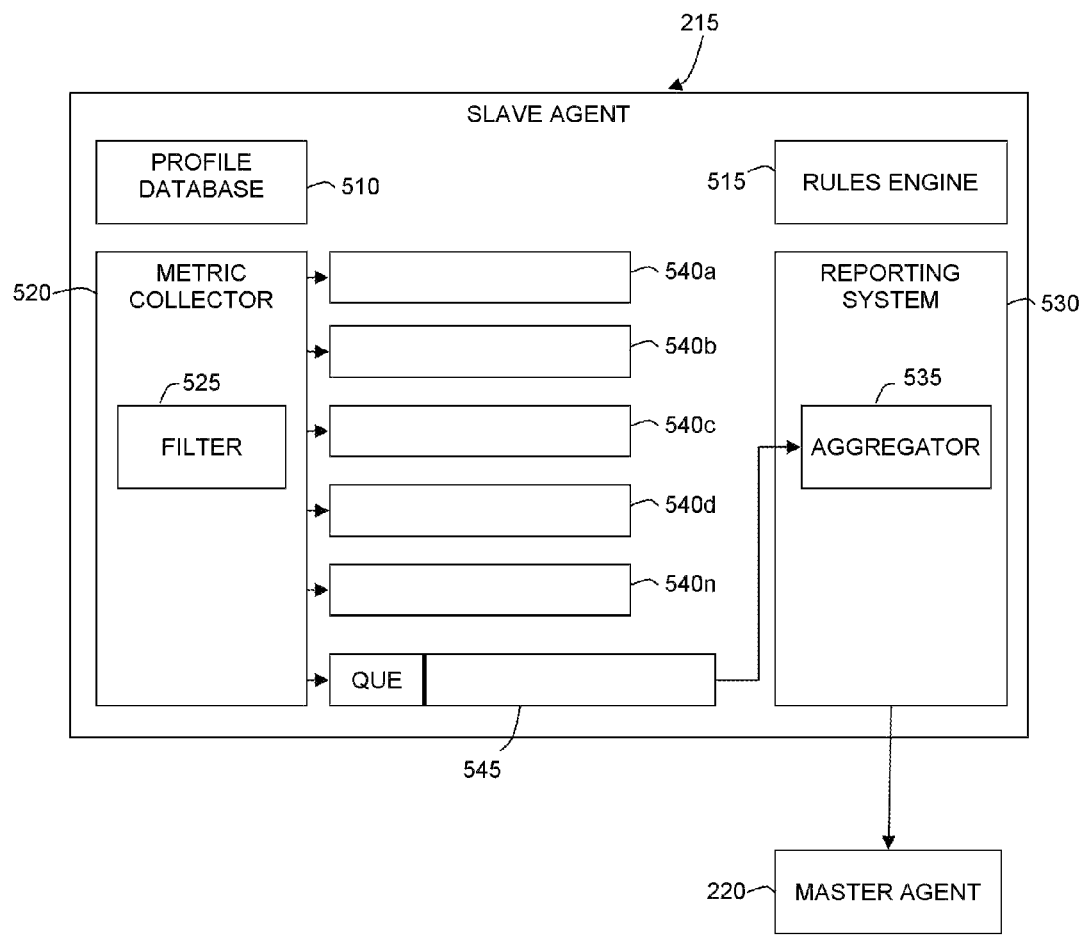
FIGS. 5A and 5B illustrates a data reporting system within a master and slave processor of the wireless device according to one embodiment of the present invention.

FIG. 5A illustrates an embodiment of the slave agent 215. In this configuration, the slave agent 215 comprises a reporting profile database 510 where the data reporting profile 300 may be stored. In addition, the slave agent 215 includes a rules engine 515 where the executable logic of the data reporting profile 300 may be compiled and stored. In one embodiment of the present invention, the rules engine 515 may be used to generate the triggers and filtering logic that is used to manage the reporting information which is reported to the slave agent 215 using a metric collector 520. The metric collector 520 is capable of communicating with the plurality of processes 250*a*-250*n* running on the application processor 205. In one embodiment, the metric collector 520 comprises a filter 525 which is capable of performing a first-pass rejection of the reporting information to determine if the information should initially be stored or not using the rules and logic of the data reporting profile 300. The metrics that are tracked and not rejected during the first-pass rejection may then be placed in a variety of buffers 540*a*-540*n*, which may be able to accommodate or store a certain number of data samples or measurements. The buffers 540*a*-540*n* may have different sizes and may be circular buffers. In one embodiment, metrics are continuously stored in the buffer 540*a*-540*n* while the device 112 is in operation. In another embodiment, the launching of an application or the use of a service may be a trigger causing metrics to be tracked and buffered. In one example, once the amount of metrics stored reaches the capacity of the memory buffer, older metrics are replaced by newer metrics so as to maintain the most recent metrics in the buffer.

The slave agent 215 also includes a queue 545 which indicates which metrics require further processing or reporting according to the parameters of the data reporting profile 300. As the slave agent 215 slowly processes the information stored in the queue 545, a number of metrics are transferred to the reporting system 530 of the slave agent 215 where the metrics are organized by the aggregator 535 into a number of metric packages, which may be subsequently sent to the master agent 220. As previously described, the triggering, filtering, aggregating, and delivery of the metrics depends on the specific rules and logic set forth in the data reporting profile 300.

Figure 5B:
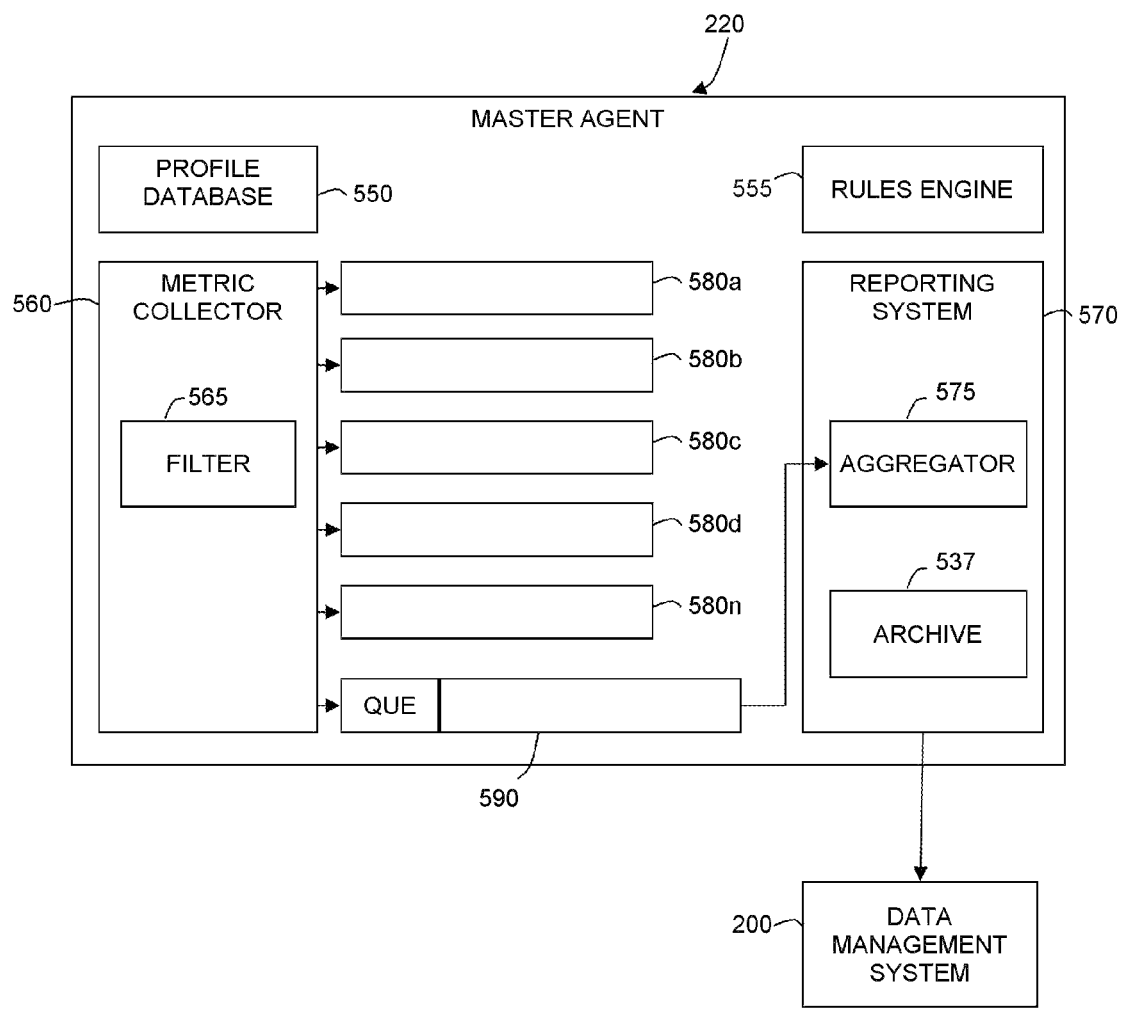

FIG. 5B is an exemplary configuration of the master agent 220 of an application processor 205 that may be used in association with the present invention. In this embodiment, the master agent 220 has a configuration that is similar to the configuration of the slave agent 215. Thus, the master agent 220 comprises a profile database 550, metric collector 560, filter 565, buffers 580*a*-580*n*, queue 590, rules engine 555, reporting system 570, aggregator 575, and reporting archive 577. In this embodiment, however, the master agent 220 is capable of receiving metric packages from the slave agent 215 and augmenting or annotating them with metrics from the processes or operations running on the application processor 205. Thus, the master agent 220 is capable of augmenting the reporting metrics of the slave agent 515 and sending aggregate reporting metrics to the data management system 200 such that the reporting metrics provide a more holistic description of the operating conditions of the handheld device. Furthermore, the aggregate reporting metrics result in the need for fewer transmissions from the mobile device 110 to the system 200 and fewer communications within the two processors 205 and 210 within the device 110, meaning that the present invention is capable of providing and efficient and reliable data reporting system that is capable of generating sophisticated contextual reporting data without unduly reducing the resources of the system.

Figure 6:
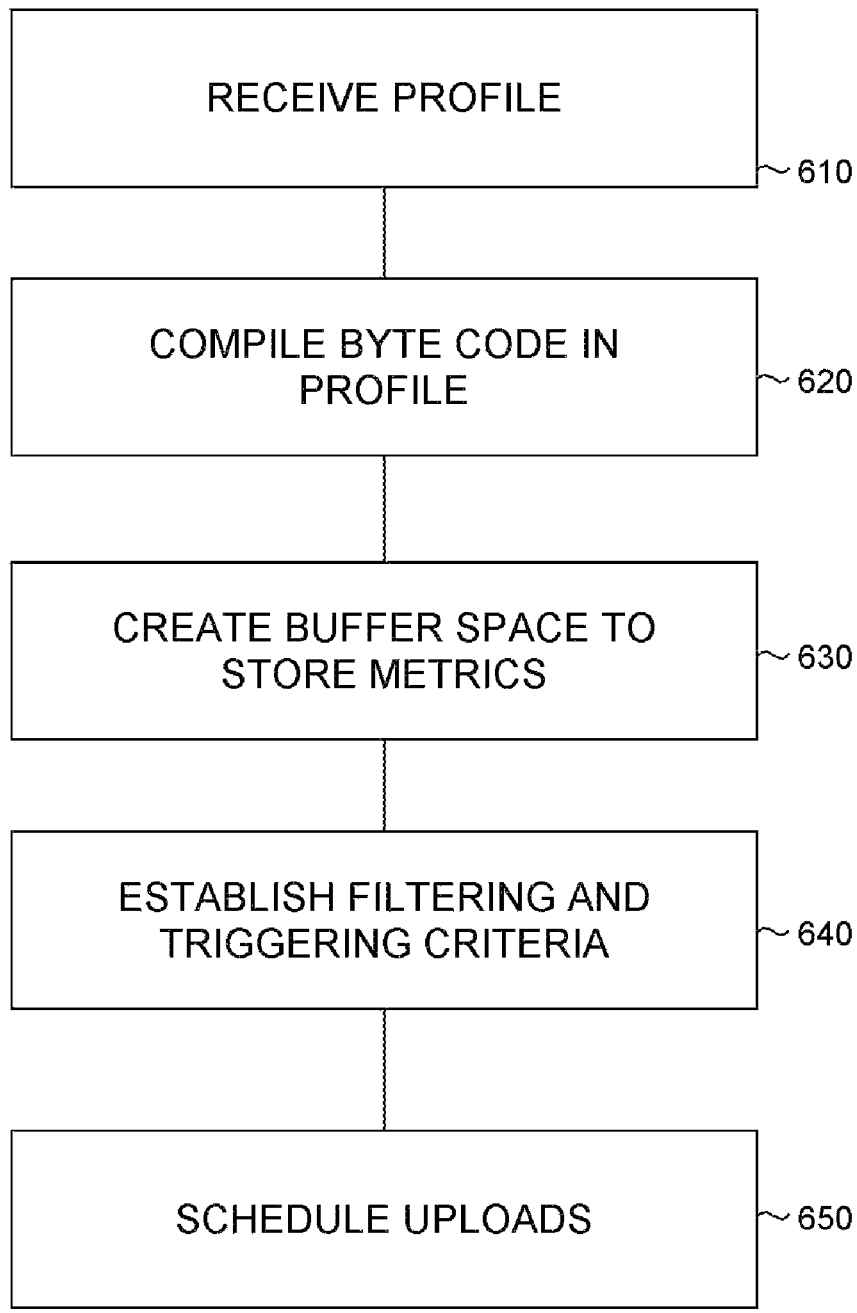
FIG. 6 is a flow diagram illustrating aspects of an exemplary process for collecting and filtering data in the programmable wireless device.

FIG. 6 is a block diagram of the present invention which illustrates a method of collecting metrics for errors by defining a series of triggers in the data reporting profile(s) transmitted to the devices 110. Although described above as being a particular key sequence, dedicated key, or menu option, a user-initiated trigger may generally be any user input defined as a trigger in a data reporting profile. First, a data reporting profile is received 610 by the agent. As previously described, one data reporting profile may be established for each agent within the device 110, preferably with one agent being the master agent over the other slave agents. In such situations, a series of data reporting profiles may be received 610 by the master agent and distributed to the appropriate slave agent.

Once the data reporting profile is received 610 by the agent, the series of executable commands in the data reporting profile is compiled 620. In the present invention, the logic and/or rules of the data reporting profile are established by including a series of executable commands which are established using any number of computer languages, protocols, or the like. In a preferred embodiment of the invention, the executable commands comprise byte code written in the Forth stack-based computer programming language, although one of ordinary skill in the art would recognize that any number of computer languages may be used in association with the present invention.

Once the executable commands in the data reporting profile are compiled 620, the agent will create 630 a variety of buffers where the reporting metrics may be stored and will establish a series of filtering and triggering criteria indicating which information should be retained, reorganized, and aggregated into metric packages. Then the agent will schedule 650 the transfer of the metric packages according to the commands within the data reporting profile.

Figure 7:
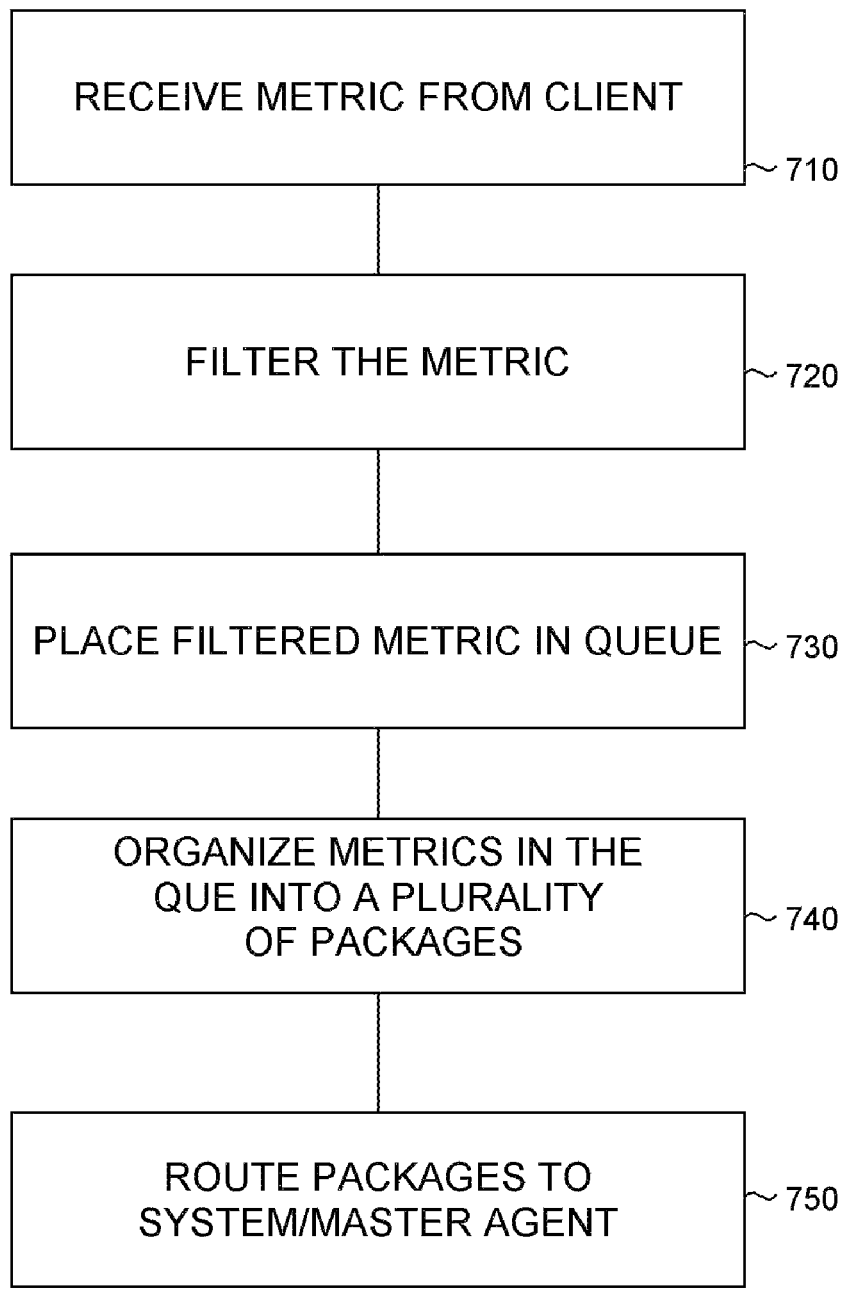
FIG. 7 is a flow diagram illustrating a method of reporting a series of filtered and annotated metrics using the programmable wireless device of the present invention.

Thus, FIG. 6 illustrates the method by which the basic logic and data management routines are established in the wireless device by the agents executing the commands within the data reporting profiles. FIG. 7 illustrates the method by which this protocol may be used to report a series of metrics to the data management system 200 connected to the device 110. Systematically, the agent will receive 710 a series of metrics from clients of the agent. As previously mentioned, one aspect of the present invention is the consistent "pushing" of reporting information to the next layer in the reporting hierarchy. Thus, in the preferred embodiment of the present invention, the agent need not specifically request a metric from a client; rather the metrics are systematically pushed from the clients to the agent. The agent then performs an initial filter 720 on the metrics to identify any triggering events and, in the event of a triggering event, determine which metrics should be stored in a buffer or immediately discarded.

After the initial filter 720, the metrics are placed 730 in a queue, where the metrics are organized 740 into a plurality of metric packages. In a typical embodiment, the metrics included in a metrics package comprise the metrics stored in the memory buffer as well as the additional metrics captured after sensing the trigger, although in other embodiments the metrics package may include only one set of metrics or the other. The memory buffer is usually configured to provide sufficient data storage to include metrics leading up to the problem and to allow for skew for a period of time prior to the triggering event. Hence, if an error typically takes 5 seconds to initiate a trigger, the buffer may be configured to store 15 seconds of data in order to include at least 10 seconds of metrics leading up to the problem.

Once the metric packages have been composed, the packages are routed to either the master agent, where the packages will be aggregated with metrics from the clients of the master agent, or the metric packages will be routed to the data management system. As previously explained, the packages are uploaded according to the rules and protocol established by the data reporting profile associated with each agent.

VI. Definition and Use of Triggers

As noted earlier, the data reporting processes performed in connection with the network and associated target devices involve the use of certain events, network conditions, trends, data points, and thresholds as a basis for the performance of other actions, such as generation, download or refinement of a data reporting profile. In addition, embodiments of the invention provide for the definition and use of various types of triggers in conjunction with data reporting profiles.

In the exemplary embodiment, a trigger is one or more conditions defined during an integration process with wireless device 110. Triggers enable an agent 215 or 220 to be invoked for the purpose of additional metric processing. Each trigger is associated with a specific identifier and defines a specific set of states that are visible to wireless device 110 software or components. When the agent functionality is invoked, the trigger identifier is compared against triggers included in the downloaded data reporting profiles to determine the proper course of action. As such, inclusion of a trigger in a specific data reporting profile effectively defines the conditions under which that data reporting profile is to take a specified action.

In the exemplary embodiment, triggers may be included in the data reporting directives of a data reporting profile, and their inclusion causes the client to initiate, abort, and terminate data reporting activity as appropriate. A trigger is defined in terms of the incoming data stream, and may result from stateful or stateless analysis of the data stream. Thus, in some instances, the trigger may correspond to a client's submission of a particular metric. In other situations, the triggers may be more complex, such as a trigger based on the content of the payload of the data stream or a trigger based on a state derived from a previous metric that has been submitted by the client.

An initiating trigger causes reporting activity to begin. A terminating trigger causes the data reporting activity to end, and a metrics package is then prepared for uploading. An abort trigger causes data reporting activity to cease, and a metrics package is not prepared or is not uploaded. In the example used earlier, launching an application may comprise a triggering event in a downloaded data reporting profile which causes data reporting activity to begin on a user's device. The user's entering of a particular key sequence, pressing of a dedicated button, or selection of a particular menu option while the application is running would cause another trigger to be activated. A terminating trigger may cause the data reporting process to stop and a metrics package to be prepared and uploaded. As can be seen, the inclusion of a trigger in a data reporting profile effectively selects the condition under which a specific action associated with that data reporting profile is to be executed. The trigger is not strictly within the data reporting profile; rather it associates a specific event on the device with a series of data reporting profile actions (start, stop, and abort).

The use of triggers provides for finely tuned data reporting activity. By linking data reporting profile actions to events defined on the device, substantially any event can be effectively measured, including measurements leading up to it and trailing it in time. Consequently, important trend information and other indicators embodied in the reporting data can be quickly identified and exploited, thereby enhancing the quality and usefulness of reporting data. Any of a variety of triggers may be defined and employed. Accordingly, the scope of the invention should not be construed to be limited to any particular type, number, combination, implementation or use of triggers.

VII. Filters

As previously described, embodiments of the present invention use a series of filters which are capable of determining which reporting metrics should be included in a metric package that is uploaded, and which metrics should be immediately discarded. One advantage of such filters is that they may be easily updated and modified by updating or modifying the data reporting profile that each agent is operating without requiring the clients of the agents to modify their reporting metrics. Thus, the same amount of reporting metrics from the clients can be repackaged and filtered into different metric packages depending on the current needs of the system without modifying the relationship between the agent and client. Moreover, in the case where a master/slave agent is used in a multi-processor wireless device, the filters may be used to mine only the information that is contextually related to a metric package previously created by another agent.

Thus, for example, using the configuration shown in FIG. 2, a metric package may be created by a slave agent 215 operating on a baseband processor 210 due to a "dropped call" triggering event. As previously described, the "dropped call" trigger initiates a reporting process wherein a metric package is created which indicates when the call was placed, when it was dropped, and what processes were operating on the device during the call which may have interfered with the call. This package may be sent to the master agent 220 on the application processor 205 which may look at the type of triggering event and time stamps of the metrics in the metric package received by the slave agent 215 and determine according to the data reporting profile that the metric package should be augmented with metrics from the master agent 220 buffer indicating what user interface events occurred prior to the dropped call. The augmented metric package may then be sent to the data management system 200 where a customer service representative or other party may evaluate all the factors influencing the conditions of the dropped call in order to determine what the actual cause of the dropped call was. Thus, the ability to contextually filter and augment the reporting data into a series of holistic metric packages is one advantage of the present invention. Another advantage is that the creation of metric packages that have been filtered to include only the meaningful or interesting material lessens the amount of drain on the wireless network's resources.

VII. Telecommunication Devices and Computing Environments

As indicated herein, embodiments of the present invention may be implemented in connection with a special purpose or general purpose telecommunications device, including wireless and wireline telephones, other wireless communication devices, or special purpose or general purpose computers that are adapted to have comparable telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

By way of example such computer-readable media can comprise RAM, ROM, flash memory, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for operation of an application processor apparatus communicatively coupled to a data management system server apparatus and further communicatively coupled to at least one baseband processor apparatus and further coupled to a user interface apparatus of a wireless device, the method comprising:
monitoring and reporting a plurality of conditions;
receiving a plurality of reporting data from a plurality of clients;
sending and receiving communications from the data management system server apparatus;
sending and receiving communications with at least one broadband processor;
applying a series of logical rules found within a first data reporting profile which governs the manner in which reporting data should be created and transferred to the data management system server;
receiving a plurality of second reporting data from the plurality of clients operating in the at least one baseband processor that has been organized according and reported according to the data reporting profile;
augmenting the plurality of second reporting data from the plurality of clients operating in the baseband processor with the plurality of first reporting data from the plurality of clients operating in the application processor that has been created and organized according to the data reporting profile; and
sending the augmented reporting data to the data management system server via a wireless system and
requesting a second data reporting profile.

2. The method of claim 1, wherein the plurality of conditions comprise any combination of contextual and environmental data about the wireless device, an application operating on the device, and a service utilized by the device.

3. The method of claim 1, wherein series of logical rules found within the data reporting profile comprises triggering criteria indicating when reporting data should be created and stored.

4. The method of claim 1, wherein said series of logical rules found within the data reporting profile comprises filtering criteria indicating which reporting data should be stored and subsequently transferred to the data management system.

5. The method of claim 1, wherein series of logical rules found within the data reporting profile comprises a plurality of uploading criteria which determine when the reporting data should be sent to the data management system.

6. The method of claim 1, wherein the logical rules found within the data reporting profile are created using a series of executable commands within the data reporting profile.

7. The method of claim 6, wherein the series of executable commands comprise Forth computer programming commands.

8. The method of claim 6, further comprising
compiling a series of computer programming byte code commands, and distributing compilation results to each processor.

9. The method of claim 1, wherein the plurality of reporting data from the plurality of clients comprises data describing the device include current application, device settings, firmware version, user entered data, or any combination thereof.

10. The method of claim 1, further comprising
receiving a data reporting profile and
transferring the data reporting profile to a broadband processor.

11. The method of claim 3, further comprising
receiving initialization triggers from a user interface apparatus of the wireless device.

12. An application processor apparatus within a wireless device, for transmitting reporting data related to event that occur in a wireless communication system of the wireless device, the apparatus comprising:
a data communications bus coupling the following elements;
a user interface circuit;
a non-transitory computer readable medium encoded with at least a data reporting profile;
a computer readable and writable store for reporting data; and
a processor being capable of monitoring and reporting a plurality of conditions and sending and receiving communications from the data management system, sending and receiving communications with a baseband processor; applying a series of logical rules found within the data reporting profile which governs the manner in which reporting data should be created and transferred to a data management system.

* * * * *